United States Patent [19]

Eiselstein et al.

[11] 4,435,359

[45] Mar. 6, 1984

[54] APPARATUS AND METHOD FOR FABRICATING TUBES FROM POWDER

[75] Inventors: Herbert L. Eiselstein; Darrell F. Smith, Jr.; Edward F. Clatworthy, all of Huntington, W. Va.

[73] Assignee: Huntington Alloys, Inc., Huntington, W. Va.

[21] Appl. No.: 390,277

[22] Filed: Jun. 21, 1982

[51] Int. Cl.³ .......................... B22F 3/02; B28B 21/42; B28B 3/08; B29D 23/04

[52] U.S. Cl. .......................... 419/3; 419/41; 264/312; 425/376 B; 425/381

[58] Field of Search .......................... 419/3, 41; 264/312; 425/376 B, 381

[56] References Cited

U.S. PATENT DOCUMENTS

| | | | |
|---|---|---|---|
| 2,651,952 | 9/1953 | Leavenworth | 78/0.5 |
| 2,902,714 | 9/1959 | Johnson | 419/3 |
| 3,158,474 | 11/1964 | Andersen et al. | 75/214 |
| 3,231,373 | 1/1966 | Marshall | 75/214 |
| 3,279,501 | 10/1966 | Donald | 264/312 |
| 3,567,437 | 3/1971 | Mott | 75/214 |
| 3,615,382 | 10/1971 | Manilla et al. | 75/214 |
| 3,876,744 | 4/1975 | Onder | 264/105 |
| 4,067,096 | 1/1978 | Whalen | 419/3 |
| 4,225,547 | 9/1980 | Okita | 264/312 |

OTHER PUBLICATIONS

"A New Method for Compacting Metal or Ceramic Powders into Continuous Sections", by F. Emley and C. Deibel, Perspectives in Powder Metallurgy, vol. 1, Chapter 6, pp. 83-97, Plenum Press, New York, 1967.

"An Experimental Investigation of the Transverse Pressing of Metal Powders", by G. M. Zhdanovich, L. S. Boginskii and V. A. Sidorov, Soviet Powder Metallurgy and Metal Ceramics, vol. 17, No. 5 (185), pp. 347-350, May 1978.

*Primary Examiner*—Brooks H. Hunt
*Attorney, Agent, or Firm*—Edward A. Steen; Raymond J. Kenny

[57] ABSTRACT

An apparatus (10) and method for fabricating tubes (26) from powders (32). A retractable, rotating mandrel (18) is disposed within a powder hopper (12) and circumscribed by a plurality of swaging dies (20). A flexible iris (14), disposed between the hopper (12) and the dies (20), reduces powder (32) loss.

As the mandrel (18) is withdrawn from the hopper (12), the dies (20) alternatingly expand and contract compacting the powder (32) in a compaction zone (48) about the mandrel (18) to form a tube (26). The resultant continuous tube (26) is withdrawn along with the mandrel (18).

9 Claims, 8 Drawing Figures

APPARATUS AND METHOD FOR FABRICATING TUBES FROM POWDER

TECHNICAL FIELD

The present invention relates to powder metallurgy and more particularly to powder metallurgical processes for producing tubular-shaped products and to apparatus for producing power metallurgical compacts.

BACKGROUND ART

It is well known that many articles have been made by powder metallurgical processes comprising pressing metallic powders together at room temperture with sufficient pressure to obtain cohesion of the particles and thereby provide a compact having sufficient strength to retain its shape when the pressure is released. Frequently the compact is sintered after pressing in order to obtain improved density, uniformity and strength in the compact. In some instances it is desirable to use sintered compacts as metal stock for making wrought products. It is also known that powder metallurgical processes frequently result in a number of economic advantages such as the elimination of the need for melting and casting metals into ingots and working ingots down to sizes near those required for making the finished articles. It is also understood that making articles from metallic powders instead of from melted alloys sometimes enables production of articles from metallic compositions containing ingredients that are difficult or impossible to combine by known melting practices, e.g., compositions comprising metal oxide powders and powders of elemental metals.

In spite of the known advantages offered by the potentials of powder metallurgy, presently known processes for compacting metal powders are not wholly satisfactory for making all the shapes and sizes in which articles are desired. Production of complex shapes, such as tubing and other tubular articles, from metallic powders presents problems involving compacting powder uniformly to obtain satisfactory uniform and high density packing in the compact. Uniform and high density of compaction are generally required where high strength is needed in the finished article. Moreover, even when a certain amount of porosity is desired in the finished article, e.g., in filters or bearings, uniformity of compaction is highly desirable in order to control the porosity. Control of compaction, of course, usually involves control over application and distribution of compacting pressure. In the powder metallurgical art it is understood that as a practical matter a mass of metallic powder under pressure in a mold (or die) does not behave like a true fluid in that the applied pressure is not transmitted uniformly throughout the mass. Failure of loose powder to behave like an ideal fluid is generally attributed to friction at the mold wall and to internal friction that occurs between particles of the powder. Although such friction and pressure distribution difficulties may be somewhat alleviated by use of lubricants, compaction of metal powders by usual methods of single-ended or double-ended pressing in a mold is generally unsatisfactory for producing uniform high-density compacts when the configuration of the compact is such that the length of the compact along the direction in which it is pressed in greater than about five times the minimum cross-sectional dimension of the compact.

Heretofore, short tubular compacts, e.g., hollow cylindrical compacts having length-to-wall thickness ratios (L:T ratios) up to about 1:1, have been made by confining metal powder in an annulus between a hollow cylindrical mold and a concentrically disposed cylindrical core and then compressing the powder from one or both ends of the annulus. However, when attempting to make longer and thinner tubes it is generally found that pressing tubular compacts endwise in such a manner fails to produce uniform compaction if the L:T ratio of the tube form is greater than about 5:1. Moreover, for producing cylindrical tubular compacts having the uniformly high density that is needed in compacts which are to be sintered and cold-drawn to tubing, such single-ended and double-ended pressing methods are wholly unsatisfactory for making long, relatively thin, tubular compacts with high L:T ratios of 5:1 and higher.

Another method of fabricating tubes from powder utilizes a can. The powder is introduced into the can whereupon it is sealed. The can is placed in an extruder having a central mandrel. The can is forced against the mandrel resulting in a tube having an outer skin made from the simultaneously extruded can. The tube must be then decanned; an involved process.

It has also been proposed to produce tubular compacts by isostatic pressing methods whereby a powder annulus is enclosed in a flexible envelope and pressure from a fluid is applied simultaneously at all points around the envelope inside and/or outside of the powder. The isostatic pressing fluid may be oil, water or gas. Although isostatic pressing in flexible envelopes may produce uniform compression of powders, such processes generally suffer from a number of disadvantages including difficulties in removing entrapped air and also difficulties in obtaining close dimensional tolerances due to flexure of the envelope during filling and pressing. Further, where it is required to produce long tubes of many feet in length, the need for obtaining sufficient force to provide the required pressure simultaneously over large areas of the tube gives rise to needs for undesirably large and expensive apparatus, especially when a high production rate is required. Moreover, the requirement for maintaining an imprevious enveloping barrier between the powder and the pressing fluid presents a source of accidental failure in production inasmuch as even a small leak in the envelope can result in entrance of the fluid into the powder mass, thus spoiling the product.

Other known methods for compacting metallic powder include powder-rolling processes and stepwise intermittent compaction processes. Of course, these methods are obviously very difficult or are wholly impractical to apply to production of hollow, cylindrical articles. Moreover, intermittent stepwise compaction may lead to detrimental lack of uniformity in the product.

Although many attempts have been made to overcome the foregoing difficulties and disadvantages and other difficulties, none, so far as we are aware, have been entirely successful when carried into practice commercially on an industrial scale.

There has now been discovered a new process whereby metallic powders are compacted to provide tubular-shaped compacts having good uniformity of compaction with close control of dimensional requirements. Further, a new apparatus having special advantages for pressing metallic powders to make long tubular compacts has also been invented.

SUMMARY OF THE INVENTION

Accordingly, there is provided an apparatus and method for producing tubular products from powders that avoid the above-mentioned difficulties and especially the extrusion and decanning operations usually associated with the production of tubes.

A retractable rotating mandrel is disposed within a powder hopper. A plurality of swaging dies are located below the hopper and are registered against a flexible iris attached to the hopper. The dies, acting in concert with the retreating mandrel, form a compacted tube.

PREFERRED MODE FOR CARRYING OUT THE INVENTION

Figure 1:
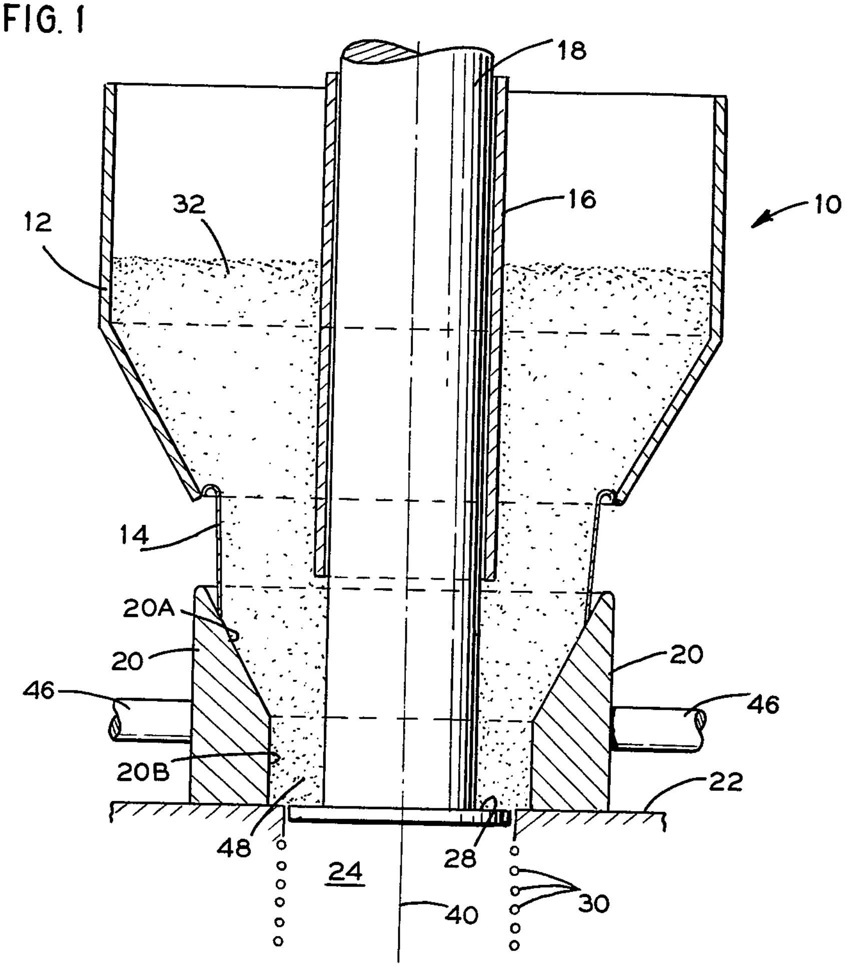
FIG. 1 is a cross-sectional elevation of the invention.

Referring to FIGS. 1–4, there is shown a tube fabricating apparatus 10. The apparatus 10 includes a powder hopper 12 having a flexible iris 14 disposed at the base of the hopper 12. An inner sleeve 16 circumscribes a rotating retractable mandrel 18. A plurality of movable swaging dies 20 having surfaces 20A and 20B are disposed below the hopper 12 and are registered with the iris 14. The dies 20 sit on a support member 22. The member 22 defines an aperture 24 through which the mandrel 18 and the resultant tube 26 are drawn. The mandrel 18 and the surfaces 20B define a compaction area 48.

The mandrel 18 includes a lip 28. The aperture 24 may be circumscribed with a plurality of sintering coils 30. Numeral 32 represents the metallic powder selected for the fabrication of the tube 26. Numeral 40 represents the axes of symmetry of the aperture 10.

Figure 5:
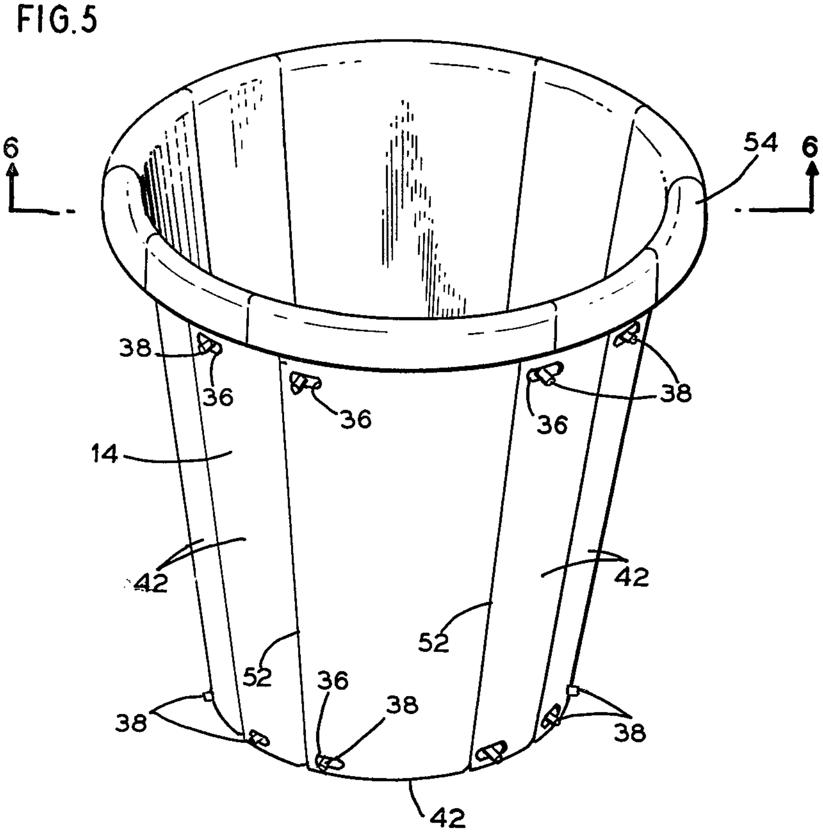
FIG. 5 is a view of a feature of the invention.
Figure 6:
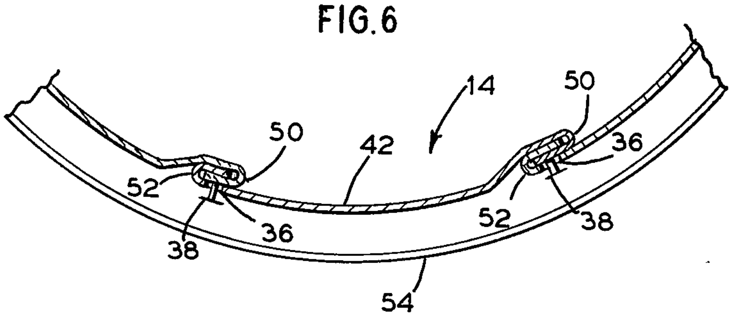
FIG. 6 is a fragmentary section taken along lines 6—6 of FIG. 5.
Figure 7:
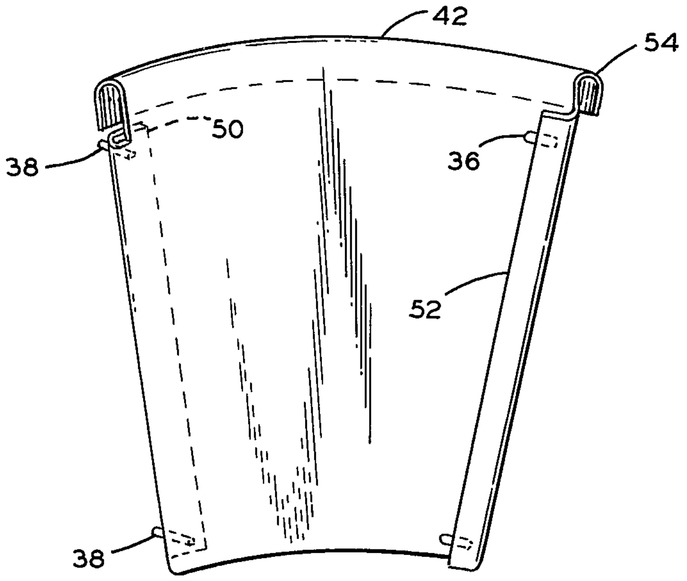
FIG. 7 is a view of a feature of the invention.

FIG. 5 is a perspective view of the iris 14. In the embodiment shown, the iris 14 is attached to the hopper 12 by rim 54. The iris 14 includes a plurality of corresponding slot 36 and pin 38 junctions to allow each panel 42 of the iris 14 to expand and contract while still maintaining the requisite closure. FIGS. 6 and 7 depict in greater detail the construction of the iris 14. FIG. 6 shows how the slot 36 accommodates the pin 38, whereas FIG. 7 illustrates an individual panel 42 of the iris 14.

Figure 8:
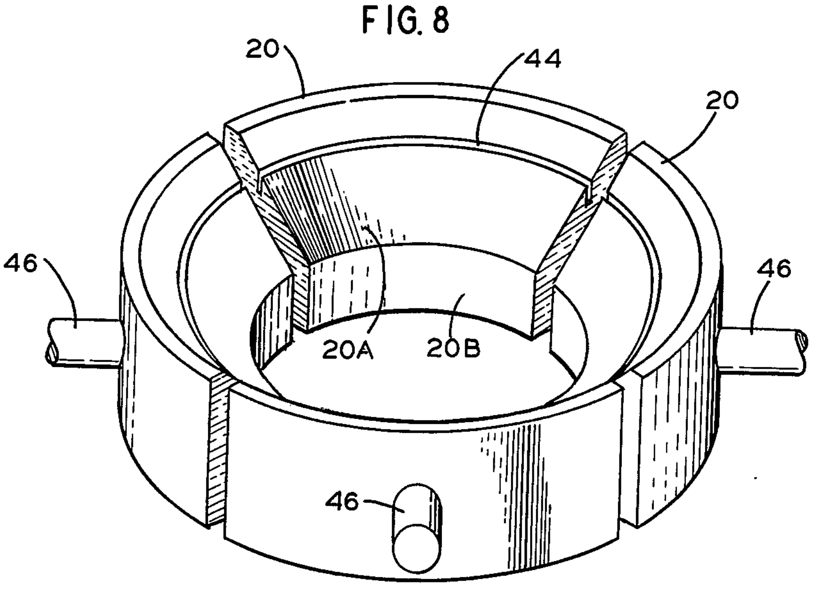
FIG. 8 is a view of a feature of the invention.

FIG. 8 depicts the swaging dies 20. Each individual die 20 includes a groove 44 to hold the iris 14 in place as the dies 20 are oscillated above the member 22. The dies 20 may be driven by any suitable means (hydraulic, mechanical, electrical, etc.) connected to die extensions 46.

The invention and the manner of applying it may perhaps be better understood by a brief discussion of the principles underlying the invention.

The apparatus and method disclosed herein fabricates seamless tubes on a continuous basis from metallic powders. Indeed, the invention is satisfactory for compacting most metallic powder mixtures that are compactible at room temperature by other methods. The invention is particularly useful for compacting ductile metal powders, such as nickel powder, cobalt powder, iron powder, copper powder, aluminum powder, magnesium powder, powders of nickel-copper alloys and powders of ductile nickel-chromium alloys, and also powders and powder mixtures of metals and alloys having suitable ductility characteristics. The metallic powder can comprise metal characteristics. The metallic powder can comprise metal oxides and other metallic compounds including thorium oxide, aluminum oxide, magnesium oxide, silicon carbide tungsten carbide, and yttrium oxide and other metallic dispersoids.

The invention is particularly successful in providing accurately dimensioned and uniformly dense compaction of powder into tubular forms. The invention also has advantages of enabling practical production of very long tubular compacts. The range of wall thicknesses which can be compacted satisfactorily of course depends somewhat on the characteristics of the powder, as well as the physical displacement and positioning of the dies. Moreover, the invention can be employed for production of tubular compacts with other cross-sectional shapes, e.g., elliptical, rectangular, hexagonal and square configurations. It is to be especially noted that the invention provides for compaction between rigid surfaces and thus enables close control over dimensional tolerances.

At the outset, (see FIG. 1) the mandrel 18 is fully extended into the sleeve 16 so that the lip 28 is substantially at the same plane as the member 22. The dies 20 (along with the iris 14) are fully expanded outwardly from the axis of symmetry 40. The powder 32 introduced into the hopper 12 will fill the compaction area 48 formed between the mandrel 18 and the dies 20.

Figure 2:
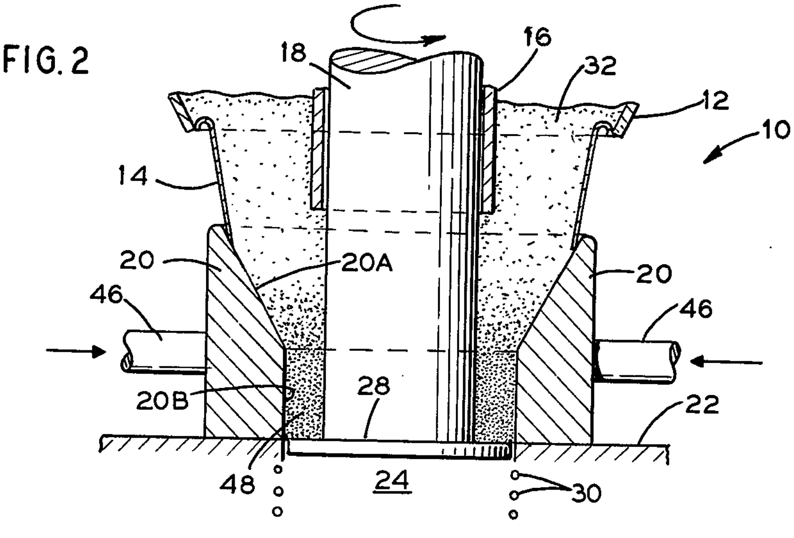
FIG. 2 is a cross-sectional elevation of the invention showing an initial processing step.

Moving onto FIG. 2, in order to initiate the compaction process, the dies 20 are driven together thereby compacting the powder 32 within the compaction area 48. Simultaneously the mandrel 18 is rotated and withdrawn from the hopper 12.

As the rotating mandrel 18 is withdrawn from the hopper 12, the dies 20 will oscillate above the member 22 alternately compacting the powder 32 in tubular form and then allowing additional powder 32 to flow into the compaction zone 48 just vacated by the newly formed tube compact "riding" the mandrel 18.

Figure 3:
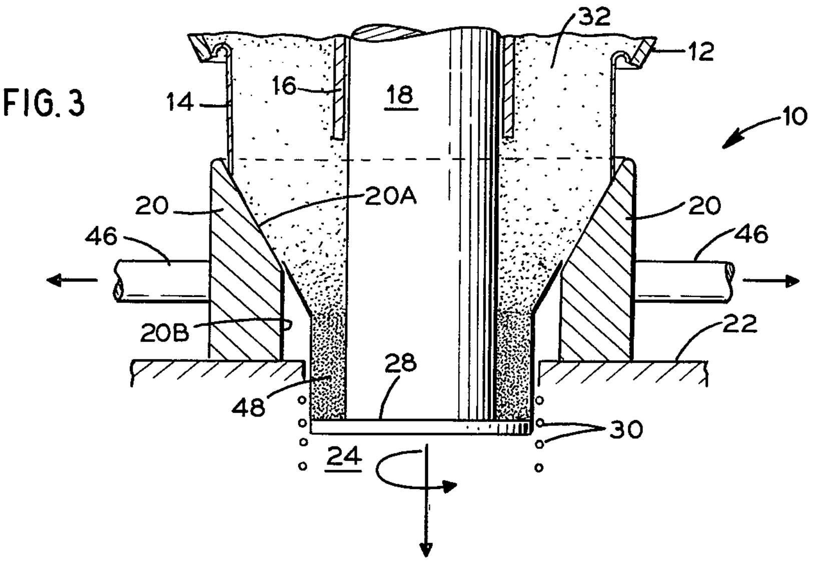
FIG. 3 is a cross-sectional elevation of the invention showing a subsequent processing step.
Figure 4:
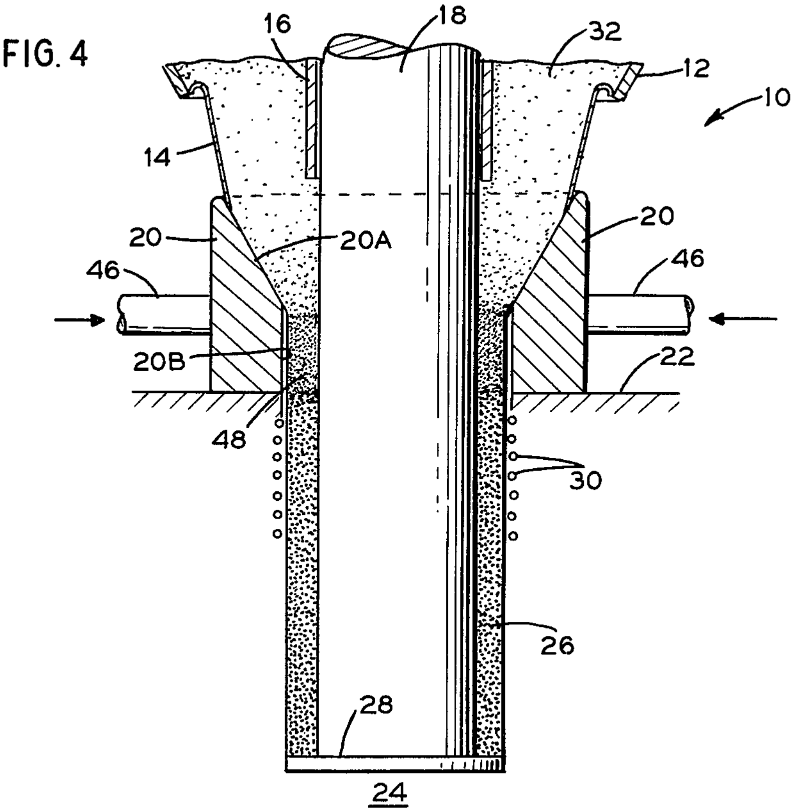
FIG. 4 is a cross-sectional elevation of the invention showing a subsequent processing step.

FIGS. 3 and 4 illustrate intermediate steps in the process. The movement of the dies 20 is synchronized with the retraction speed of the mandrel 18 so as to properly form the tube 26.

The sloped die surface 20A feeds the powder 32 towards the compaction zone 48 whereas both die surfaces 20A and 20B compress the powder 32 against the mandrel 18 to form the seamless tube 26. As the mandrel 18 is withdrawn from the hopper 12 the resultant tube 26 is drawn simultaneously. The dies 20 are expanded to allow additional powder 32 to flow towards the compaction area 48 whereupon the dies 20 are then contracted to compact the powder 32 again. By regulating the travel distance of the dies 20, the outside diameter of the resultant tube 26 may be easily controlled. By the same token, the inside diameter of the tube 26 will be a function of the diameter of the mandrel 18.

In order to retain the powder 32 within the hopper 12 while simultaneously accommodating the to and fro movement of the dies 20, the iris 14 is flexible. The iris 14, affixed to the lower edge of the hopper 12, is inserted into the groove 44. As the dies 20 move, the iris 14 correspondingly contracts and expands in accordance with the movement of the dies 20.

In the illustrated embodiment, (see FIGS. 5, 6 and 7) the iris 14 includes a plurality of interlocked, sliding panels 42. Each panel 42 includes two oppositely curved members 50 and 52 serpentinely interconnected. The outer member 50 includes two pins 38 that are fitted into two corresponding slots 36 formed in the inner member 52. The panel rim 54 attaches the iris 14 to the lower portion of the hopper 12. The lower portion of the iris 14 fits into the groove 44 of the dies 20.

By utilizing a sliding pin 38 and slot 36 junction, the iris 14 is free to expand and contract in conjunction with the movement of the swaging die 20.

The coils 30 sinter the resultant tube 26 to enhance its physical and morphological characteristics.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or priviledge is claimed are defined as follows:

1. An apparatus for fabricating tubes from metal powders, the apparatus comprising a powder hopper, means for rotating and withdrawing the mandrel from the hopper, a plurality of arcuate tube forming dies spatially circumscribing the mandrel, means for expanding and contracting the dies about the mandrel, the dies and the mandrel defining a tube compaction zone therebetween, flexible means disposed between the hopper and the dies for preventing the powder from escaping from the hopper, and an aperture for withdrawing the mandrel and resultant tube through the aperture disposed after the compaction zone.

2. The apparatus according to claim 1 wherein the flexible means is an iris registered with the hopper and the dies, the iris changing its volumetric capacity in response to the movement of the dies, the dies having an upper surface and a lower surface, and the upper surface of the dies having means therein for supporting the iris.

3. The apparatus according to claim 1 wherein sintering coils are disposed below the aperture.

4. The apparatus according to claim 1 wherein a sleeve circumscribes the mandrel within the hopper.

5. The apparatus according to claim 1 wherein the mandrel includes a lip.

6. The apparatus according to claim 1 wherein the dies are slidably registered against a support member defining the aperture.

7. A method for fabricating tubes from metal powders, the method comprising:

a. introducing the powder into a hopper;

b. rotating a mandrel disposed within the hopper, the powder in communication with the mandrel;

c. contracting a plurality of arcuate dies spatially disposed about the mandrel to compact the powder in a compaction zone formed between the mandrel and the dies to form a tube section;

d. withdrawing the mandrel and resultant tube section;

e. expanding the dies to permit additional powder to enter the compaction zone;

g. flexing flexible means disposed between the hopper and the die, to prevent the powder from escaping from the hopper; and h. repeating steps (a) through (g) until a continuous tube of desired length is fabricated.

8. The method according to claim 7 comprising the additional step of sintering the resultant tube.

9. The apparatus according to claim 2 wherein the iris includes a plurality of interconnected sliding panels.

* * * * *